(12) United States Patent
Numata (10) Patent No.: US 8,114,549 B2
(45) Date of Patent: Feb. 14, 2012

(54) FUEL CELL

(75) Inventor: Koichi Numata, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 470 days.

(21) Appl. No.: 12/309,837

(22) PCT Filed: Sep. 10, 2007

(86) PCT No.: PCT/IB2007/002592
§ 371 (c)(1),
(2), (4) Date: Jan. 30, 2009

(87) PCT Pub. No.: WO2008/032168
PCT Pub. Date: Mar. 20, 2008

(65) Prior Publication Data
US 2009/0325020 A1   Dec. 31, 2009

(30) Foreign Application Priority Data

Sep. 11, 2006   (JP) ................................. 2006-245543

(51) Int. Cl.
*H01M 8/04* (2006.01)
(52) U.S. Cl. ........................................ 429/450; 429/514
(58) Field of Classification Search .................. 429/450, 429/479, 514, 520
See application file for complete search history.

(56) References Cited

U.S. PATENT DOCUMENTS

| | | | |
|---|---|---|---|
| 6,733,911 B2 * | 5/2004 | Kawahara | 429/450 |
| 6,991,870 B2 * | 1/2006 | Yasumoto et al. | 429/457 |
| 7,531,266 B2 * | 5/2009 | Sano et al. | 429/415 |
| 7,838,163 B2 * | 11/2010 | Nishida et al. | 429/457 |
| 7,951,481 B2 * | 5/2011 | Ishioka et al. | 429/129 |
| 2004/0157111 A1 * | 8/2004 | Sakamoto et al. | 429/44 |
| 2005/0202298 A1 * | 9/2005 | Okazaki et al. | 429/32 |
| 2005/0244699 A1 * | 11/2005 | Shimoi et al. | 429/34 |
| 2006/0054269 A1 * | 3/2006 | Nishi et al. | 156/73.6 |
| 2006/0099481 A1 | 5/2006 | Ji et al. | |
| 2007/0148528 A1 * | 6/2007 | Sakai | 429/38 |
| 2007/0184327 A1 * | 8/2007 | Ishioka et al. | 429/35 |
| 2008/0014486 A1 * | 1/2008 | Unoki et al. | 429/26 |
| 2008/0318103 A1 * | 12/2008 | Tsuji et al. | 429/27 |

FOREIGN PATENT DOCUMENTS

| | | |
|---|---|---|
| CA | 2256276 | 6/1999 |
| EP | 1 176 651 A2 | 1/2002 |
| JP | A-11-097041 | 4/1999 |
| JP | A-2002-042844 | 2/2002 |
| JP | A-2002-298871 | 10/2002 |
| JP | A-2004-152517 | 5/2004 |
| JP | A-2004-327060 | 11/2004 |

OTHER PUBLICATIONS

Canadian Office Action in Canadian Application No. 2,659,877; dated Dec. 14, 2010.

* cited by examiner

*Primary Examiner* — Thanh Tam Le
(74) *Attorney, Agent, or Firm* — Oliff & Berridge, PLC

(57) ABSTRACT

In a polymer electrolyte membrane fuel cell, a groove (cathode-side gas flow path) in a cathode-side separator, and a groove (anode-side gas flow path) in an anode-side separator are formed such that air and hydrogen flow in a direction opposite to the direction of gravity. A surface treatment may applied to the surface of the grooves such that the hydrophilicity is higher on the downstream side than on the upstream side in the grooves.

33 Claims, 5 Drawing Sheets

FIG. 5

FUEL CELL

BACKGROUND OF THE INVENTION

1. Field of the Invention

The present invention relates to a fuel cell.

2. Description of the Related Art

Fuel cells that generate electric power through an electrochemical reaction between hydrogen and oxygen have been attracting attention as an energy source. An example of such a fuel cell is a polymer electrolyte fuel cell that uses a polymer electrolyte membrane as an electrolyte membrane. In this polymer electrolyte fuel cell, in order to attain a desired power generation performance, it is necessary to regulate membrane moisture of the electrolyte membrane to retain appropriate proton conductivity. For this reason, in a polymer electrolyte fuel cell, it is necessary to humidify the electrolyte membrane during the power generation process. Moreover, in order to make the power generation performance uniform in the plane of a cell, it is also necessary to maintain uniform moisture across the plane of the electrolyte membrane.

A humidifier that humidifies oxidant gas supplied to the cathode has been used to humidify the electrolyte membrane of a polymer electrolyte fuel cell. The use of the humidifier has led to an increase in the size of the fuel cell system. In recent years, there has been proposed a technique in which water produced through the above-described electrochemical reaction during power generation is re-circulated within a fuel cell to humidify the oxidant gas and the electrolyte membrane without using a humidifier (see, for example, Japanese Patent Application Publication No. 2002-42844 (JP-A-2002-42844)). Hereinafter, the operation of humidifying oxidant gas, fuel gas, or an electrolyte membrane by re-circulating water produced during power generation within a fuel cell will be referred to as "self-humidification".

The technique described in Japanese Patent Application Publication No. 2002-42844 (JP-A-2002-42844) enables self-humidification of oxidant gas. According to this technique, oxidant gas is humidified by water, and this humidified oxidant gas is used to humidify the electrolyte membrane. However, this technique does not provide sufficient humidification of the upstream side of the electrolyte membrane in the oxidant gas flow direction. A large variation in moisture thus occurs in the plane of the electrolyte membrane. Such a variation in moisture may occur not only on the oxidant gas side but also on the fuel gas side. This is because the water that is produced at the cathode may also be transmitted to the anode side through the electrolyte membrane.

DISCLOSURE OF THE INVENTION

The present invention provides for the self-humidification of an electrolyte membrane and distributes moisture uniformly in the plane of the electrolyte membrane in a polymer electrolyte fuel cell.

A first aspect of the present invention relates to a fuel cell having a membrane electrode assembly supported by a separator on either side, the membrane electrode assembly having an anode and a cathode respectively bonded to surfaces of a polymer electrolyte membrane. The fuel cell includes: an anode-side gas flow path, provided between the anode and the separator, that supplies fuel gas containing hydrogen to the anode; and a cathode-side gas flow path, provided between the cathode and the separator, that supplies oxidant gas containing oxygen to the cathode. The cathode-side gas flow path is formed such that the oxidant gas flows in a direction substantially opposite to the direction of an external force exerted on water produced at the cathode by the electrochemical reaction between hydrogen contained in the fuel gas and oxygen contained in the oxidant gas upon power generation, and that hydrophilicity on the downstream side in the flow direction of the oxidant gas is higher than hydrophilicity on the upstream side. Hydrophilicity on the downstream side in the flow direction of the oxidant gas may be made higher than hydrophilicity on the upstream side by applying hydrophilic treatment on the upstream side of the cathode-side gas flow path in the flow direction of the oxidant gas.

Generally speaking, in a fuel cell, drying tends to occur in the upstream side of the electrolyte membrane (i.e., inlet side of oxidant gas). Accordingly, the amount of power generation and the amount of water produced in the downstream side of the membrane electrode assembly tend to be greater than the amount of power generation and the amount of water produced in the upstream side of the membrane electrode assembly.

According to the present invention, hydrophilicity of the cathode-side gas flow path is higher on the downstream side than the upstream side in the oxidant gas flow direction. Accordingly, the water produced in the downstream side of the membrane electrode assembly during power generation is drawn into and retained by the region of the downstream side of the cathode-side gas flow path on the, which has a high hydrophilicity. Because the cathode-side gas flow path is formed such that oxidant gas flows in a direction substantially opposite to an external force exerted on the water, such as gravity, the water moves due to this external force to the upstream side of the cathode-side gas flow path against the flow of oxidant gas. Because the cathode-side gas flow path is formed such that hydrophobicity is high on the upstream side of the cathode-side gas flow path in the oxidant gas flow direction, the water that has moved to the upstream side is repelled and moved to the surface of the membrane electrode assembly on the upstream side in the oxidant gas flow direction, thereby making it possible to humidify the upstream side of the electrolyte membrane, which is prone to drying. Therefore, according to the present invention, by re-circulating liquid water within the fuel cell, it is possible to achieve self-humidification of the electrolyte membrane and maintain the uniform moisture distribution in the plane of the electrolyte membrane.

In the above-described fuel cell, the cathode-side gas flow path may be formed so that, on the upstream side in the flow direction of the oxidant gas, hydrophilicity at a portion where an upstream-side portion of the separator overlaps with a boundary part of the separator with the cathode is higher than hydrophilicity at the other part of the upstream-side portion of the separator.

Accordingly, the water that has moved to the upstream side in the oxidant gas flow direction due to an external force can be readily drawn into the boundary and moved to the membrane electrode assembly.

In any one of the fuel cells described above, the cathode-side gas flow path may be a groove formed in a surface of the separator that is in contact with the cathode. Further, the cathode-side gas flow path may be formed in a metallic porous member.

In the former case, the cathode-side gas flow path in which the hydrophilicity and hydrophobicity are set as described above may be formed by applying a coating of hydrophilic agent or hydrophobic agent, for example, to the groove formed in the surface of the separator in contact with the cathode. If the cathode-side gas flow path is formed in a porous metallic member, the hydrophilicity and hydrophobicity of the cathode-side gas flow path may be formed by impregnating the metallic porous member with a hydrophilic agent or hydrophobic agent, for example.

In any one of the fuel cells described above, the anode-side gas flow path may be formed so that the fuel gas flows in substantially the same direction as the direction of the external force.

In this case, as described above, drying tends to occur in the electrolyte membrane on the upstream side (inlet side of oxidant gas) in the oxidant gas flow direction in a fuel cell. Accordingly, the amount of power generation and the amount of water produced in the membrane electrode assembly on the downstream side in the oxidant gas flow direction tend to be greater than the amount of power generation and the amount of water produced in the membrane electrode assembly on the upstream side in the oxidant gas flow direction. Further, the water is produced at the cathode, and transmitted also to the anode through the electrolyte membrane. Therefore, the amount of water transmitted to the anode also tends to be larger on the downstream side in the oxidant gas flow direction, that is, on the upstream side in the fuel gas flow direction, than on the upstream side in the oxidant gas flow direction, that is, on the downstream side in the fuel gas flow direction.

When the anode-side gas flow path is formed such that fuel gas flows in substantially the same direction as the direction of the external force, the water produced at the cathode of the membrane electrode assembly on the downstream side in the oxidant gas flow direction upon power generation and transmitted to the anode through the electrolyte membrane may be moved from the surface of the membrane electrode assembly on the upstream side in the fuel gas flow direction to the surface of the membrane electrode assembly on the downstream side in the flue gas flow direction by means of both the above-described external force and fuel gas flow. The electrolyte membrane on the upstream side in the oxidant gas flow direction, which is prone to drying, is thus humidified from the anode side.

The anode-side gas flow path may also be formed so that the fuel gas flows in substantially the same direction as the direction of the external force, and that hydrophilicity on the downstream side in the flow direction of the fuel gas is higher than hydrophilicity on the upstream side.

Accordingly, the water produced at the cathode of the membrane electrode assembly on the downstream side in the oxidant gas flow direction during power generation and transmitted to the anode through the electrolyte membrane is drawn into and retained by the region of the anode-side gas flow path on the downstream side in the fuel gas flow direction which has a high hydrophilicity. Because the anode-side gas flow path is formed such that oxidant gas flows in a direction substantially opposite to an external force exerted on the water, such as gravity, the water moves due to this external force to the upstream side in the fuel gas flow direction, against the flow of fuel gas. Because the anode-side gas flow path is formed such that hydrophobicity is high on the upstream side in the fuel gas flow direction, the water that has moved to the upstream side in the fuel gas flow direction is repelled and moved to the surface of the membrane electrode assembly on the upstream side in the fuel gas flow direction. The electrolyte membrane on the upstream side in the oxidant gas flow direction, which is prone to drying, is thus humidified from the anode side.

In the above-described fuel cell, the anode-side gas flow path may be formed so that, on the upstream side in the flow direction of the fuel gas, hydrophilicity at a portion where an upstream-side portion of the separator overlaps with a boundary part of the separator with the anode is higher than hydrophilicity at the other part of the upstream-side portion of the separator.

Accordingly, the water that has moved to the upstream side in the fuel gas flow direction due to the external force is readily drawn into the boundary and moved to the membrane electrode assembly.

In the above-described fuel cell, the anode-side gas flow path may be a groove formed in a surface of the separator that is in contact with the anode. Further, the anode-side gas flow path may be formed in a metallic porous member.

In the former case, the anode-side gas flow path whose hydrophilicity and hydrophobicity are set as described above can be formed by applying a coating of hydrophilic agent or hydrophobic agent, for example, to the groove formed in the surface of the separator in contact with the anode. If the anode-side gas flow path is formed in a porous metallic member, the hydrophilicity and hydrophobicity of the anode-side gas flow path may be formed by impregnating the metallic porous member with a hydrophilic agent or hydrophobic agent, for example.

A second aspect of the present invention relates to a fuel cell having a membrane electrode assembly supported by a separator on either side, the membrane electrode assembly having an anode and a cathode respectively bonded to surfaces of an polymer electrolyte membrane, including: an anode-side gas flow path provided between the anode and the separator, for supplying fuel gas containing hydrogen to the anode; and a cathode-side gas flow path provided between the cathode and the separator, for supplying oxidant gas containing oxygen to the cathode. The anode-side gas flow path is formed so that the fuel gas flows in a direction substantially opposite to the direction of an external force exerted on the water produced at the cathode, and that hydrophilicity on the downstream side in the flow direction of the fuel gas is higher than hydrophilicity on the upstream side. Hydrophilicity on the downstream side in the flow direction of the anode gas may be made higher than hydrophilicity on the upstream side by applying hydrophilic treatment on the upstream side of the anode-side gas flow path in the flow direction of the anode gas.

As described above, the water is produced at the cathode, and also transmitted to the anode through the electrolyte membrane.

According to the present invention, the anode-side gas flow path is formed such that hydrophilicity is high on the downstream side in the fuel gas flow direction. Accordingly, the water produced in the membrane electrode assembly on the downstream side in the fuel gas flow direction upon power generation and transmitted to the anode through the electrolyte membrane is drawn into and retained by the region of the anode-side gas flow path on the downstream side in the fuel gas flow direction which has a high hydrophilicity. Because the anode-side gas flow path is formed such that fuel gas flows in a direction substantially opposite to an external force exerted on the water, such as gravity, the water moves due to this external force to the upstream side in the fuel gas flow direction, against the flow of fuel gas. Because the anode-side gas flow path is formed such that hydrophobicity is high on the upstream side in the fuel gas flow direction, the water that has moved to the upstream side in the fuel gas flow direction is repelled and moved to the surface of the membrane electrode assembly on the upstream side in the fuel gas flow direction, thereby making it possible to humidify the electrolyte membrane on the upstream side in the fuel gas flow direction from the anode side. Therefore, according to the present invention, by re-circulating liquid water within the fuel cell, it is possible to achieve self-humidification of the electrolyte membrane and maintain uniform moisture distribution in the plane of the electrolyte membrane.

In the above-described fuel cell, the anode-side gas flow path may be formed so that on the upstream side in the flow direction of the fuel gas, hydrophilicity at a boundary part with the anode is higher than hydrophilicity in other parts on the upstream side.

Accordingly, the water that has moved to the upstream side in the fuel gas flow direction due to the external force can be readily drawn into the boundary and moved to the membrane electrode assembly.

According to the second aspect of the present invention, the anode-side gas flow path may be a groove formed in a surface of the separator that is in contact with the anode. Further, the anode-side gas flow path may be formed in a metallic porous member.

In the former case, the anode-side gas flow path whose hydrophilicity and hydrophobicity are set as described above can be formed by applying a coating of hydrophilic agent or hydrophobic agent, for example, to the groove formed in the surface of the separator in contact with the anode. If the anode-side gas flow path is formed in a porous metallic member, the hydrophilicity and hydrophobicity of the anode-side gas flow path whose may be formed by impregnating the metallic porous member with a hydrophilic agent or hydrophobic agent, for example.

It should be noted that in the fuel cell according to the second aspect of the present invention, the cathode-side gas flow path is preferably formed so that the fuel gas flows in a direction substantially opposite to the direction of the external force.

Accordingly, due to the flow of oxidant gas, a force is exerted on the water produced at the cathode in a direction substantially opposite to the direction of the external force. Therefore, the water may be moved by the external force in the direction of the external force to be used for humidification of the electrolyte membrane, and the speed at which the water moves in the direction of the external force may be decreased by the flow of oxidant gas. It is thus possible to prevent the water from being discharged from the cathode surface of the membrane electrode assembly without being used for the humidification of the electrolyte membrane.

In the fuel cell according to the first or second aspect of the present invention, the direction of the external force may be the direction of gravity.

Accordingly, it is possible to self-humidify the electrolyte membrane and uniformly distribute moisture in the plane direction of the electrolyte membrane under an environment where gravity is exerted on the water and the water readily moves in the direction of gravity.

In addition to the fuel cell described above, the present invention may also be configured as a fuel cell system including the fuel cell.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A description will now be made of a mode of the present invention based on embodiments in the following order: A. First Embodiment; B. Second Embodiment; C. Third Embodiment; D. Fourth Embodiment; and E. Modifications.

A. First Embodiment

Figure 1A:
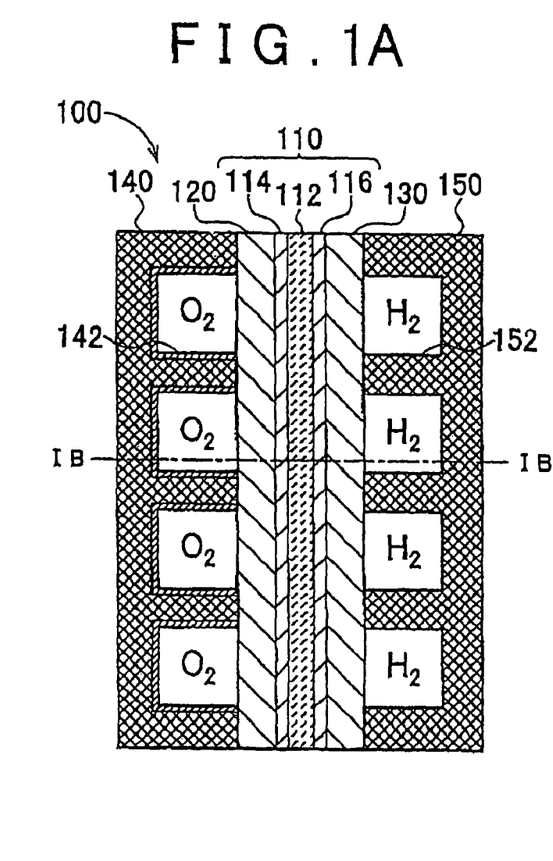
FIGS. 1A and 1B are explanatory views schematically showing the cross sectional structure of a fuel cell 100 according to a first embodiment of the present invention.
Figure 1B:
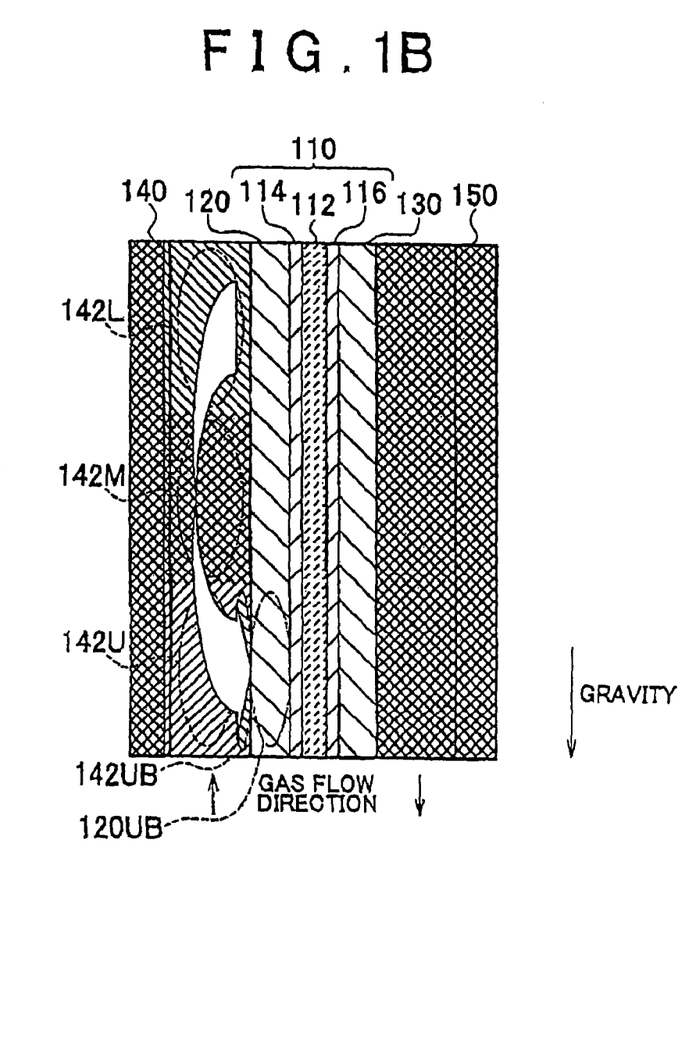

FIGS. 1A and 1B are explanatory views schematically showing the cross sectional structure of a fuel cell 100 according to a first embodiment of the present invention. FIG. 1A is a sectional view as seen in a direction parallel to the direction of gas flow in the fuel cell 100, and FIG. 1B is a sectional view taken along the line IB-IB of FIG. 1A.

The fuel cell 100 is formed by bonding a cathode-side gas diffusion layer 120 and an anode-side gas diffusion layer 130 respectively to opposite surfaces of a membrane electrode assembly 110, and supporting the resulting structure between a cathode-side separator 140 and an anode-side separator 150.

The membrane electrode assembly 110 has a cathode-side catalyst layer 114 and an anode-side catalyst layer 116 respectively bonded to surfaces of an electrolyte membrane 112 having proton conductivity. In this embodiment, a polymer electrolyte membrane such as Nafion (registered trademark) is used as the electrolyte membrane 112. The cathode-side catalyst layer 114 and the anode-side catalyst layer 116 carry a catalyst that promotes the electrochemical reaction between hydrogen and oxygen. The cathode-side gas diffusion layer 120 and the anode-side gas diffusion layer 130 are bonded to the surfaces of the cathode-side catalyst layer 114 and anode-side catalyst layer 116, respectively. The cathode-side gas diffusion layer 120 diffuses air that is supplied to the cathode-side catalyst layer 114. The anode-side gas diffusion layer 130 diffuse hydrogen that is supplied to the anode-side catalyst layer 116. The cathode-side catalyst layer 114 and the cathode-side gas diffusion layer 120 each function as a cathode, and the anode-side catalyst layer 116 and the anode-side gas diffusion layer 130 each function as an anode.

Hydrogen as fuel gas, and air containing oxygen as oxidant gas are respectively supplied to the anode and cathode of the membrane electrode assembly 110, and electric power is generated through an electrochemical reaction between the hydrogen and oxygen. At this time, water is produced through a cathode reaction in the cathode-side catalyst layer 114. It should be noted that the water produced at the cathode is also transmitted to the anode-side catalyst layer 116 through the electrolyte membrane 112.

Figure 5:
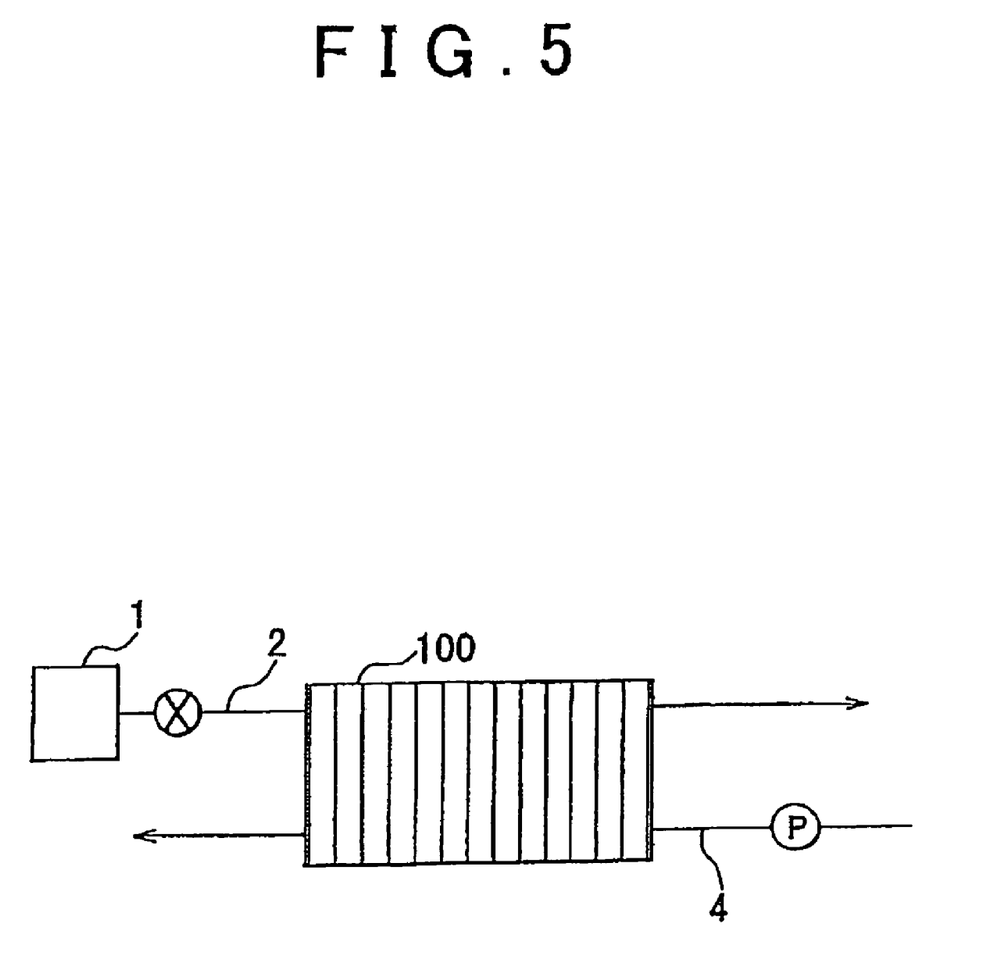
FIG. 5 shows a fuel cell system including the fuel cell according to the first embodiment.

FIG. 5 shows a fuel cell system including the above-described fuel cell. The hydrogen is supplied from a hydrogen tank to the fuel cell 100 via a pipe 2. Air is supplied to the fuel cell 100 via a pipe 4 using a pump. Oxygen gas as oxidant gas may be supplied from an oxygen tank to the fuel cell 100.

The fuel cell 100 according to this embodiment is a polymer electrolyte fuel cell using a solid polymer electrolyte membrane as the electrolyte membrane 112. Hence, in order to attain a predetermined power generation performance, it is necessary to regulate the moisture of the electrolyte membrane 112 to maintain appropriate proton conductivity. Accordingly, the fuel cell 100 according to this embodiment re-circulates the water within the fuel cell 100 in a liquid state to self-humidify the electrolyte membrane 112. The configuration for realizing this self-humidification will be described below.

As shown in FIG. 1A, the cathode-side separator 140 arranged on the cathode side of the membrane electrode assembly 110 has a groove 142 formed in a surface that is in contact with the cathode-side gas diffusion layer 120. The groove 142 forms a gas flow path in which air flows. The groove 142 can be regarded as a cathode-side gas flow path according to the present invention. The anode-side separator 150 arranged on the anode side of the membrane electrode assembly 110 has a groove 152 formed in a surface that is in contact with the anode-side gas diffusion layer 130. The groove 152 forms a gas flow path in which hydrogen flows. The groove 152 can be regarded as an anode-side gas flow path according to the present invention.

As shown in FIG. 1B, the groove 142 in the cathode-side separator 140 is formed such that air flows in a direction opposite to the direction of gravity, that is, from down to up. Surface treatment is applied to the surface of the groove 142. Specifically, a hydrophilic treatment is applied as surface treatment to a downstream region 142L in the air flow direction of the groove 142, and hydrophobic treatment is applied to an upstream region 142U in the air flow direction of the groove 142. In this embodiment, no surface treatment is applied to a midstream region 142M in the air flow direction of the groove 142. That is, the groove 142 is formed such that the hydrophilicity on the downstream side in the air flow direction is higher than the hydrophilicity on the upstream side. In the upstream region in the air flow direction of the groove 142, hydrophilic treatment is applied as surface treatment to an upstream side boundary part 142UB with the cathode-side gas diffusion layer 120. It should be noted that in this embodiment, the hydrophilic treatment and the hydrophobic treatment described above are respectively applied by coating the surface of the groove 142 with a hydrophilic agent and a hydrophobic agent. In the groove 142, the area of the region to which the above-described surface treatment is applied, or the degrees of hydrophilicity and hydrophobicity may be set in an arbitrary manner in accordance with the power generation performance of the fuel cell 100 or the like.

By forming the groove 142 in the cathode-side separator 140 in the manner as described above, the water produced in the cathode-side catalyst layer 114 moves as described below (see the hollow white arrow in FIG. 1B). It should be noted that generally speaking, in the fuel cell 100, drying tends to occur in the upstream side of the electrolyte membrane 112. Accordingly, the amount of power generation and the amount of water produced in the membrane electrode assembly 110 on the downstream side in the air flow direction tend to be larger than the amount of power generation and the amount of water produced in the membrane electrode assembly 110 on the upstream side in the air flow direction.

In the fuel cell 100 according to this embodiment, the groove 142 in the cathode-side separator 140 is formed such that hydrophilicity is high on the downstream side in the air flow direction. Accordingly, the water produced in the membrane electrode assembly 110 on the downstream side in the air flow direction upon power generation is drawn into and retained by the downstream region 142L of the groove 142, which has a high hydrophilicity. Because the groove 142 is formed such that air flows in the direction opposite to the direction of gravity, the water moves due to gravity from the downstream region 142L to the upstream region 142U through the midstream region 142M, against the flow of air. Because the groove 142 is formed such that hydrophobicity is high on the upstream side in the air flow direction, the water that has moved to the upstream region 142U is repelled and drawn into the upstream side boundary part 142UB of high hydrophilicity, and is further moved to the surface of the membrane electrode assembly 110 on the upstream side through the cathode-side gas diffusion layer 120 and the cathode-side catalyst layer 114, thereby making it possible to humidify the upstream side of the electrolyte membrane 112, which is prone to drying.

On the other hand, as shown in FIG. 1B, the groove 152 in the anode-side separator 150 is formed such that hydrogen flows in the same direction as the direction of gravity, that is, from up to down. It should be noted that in this embodiment, the surface treatments applied to the surface of the groove 142 in the cathode-side separator 140, that is, hydrophilic treatment and hydrophobic treatment, are not applied to the surface of the groove 152 in the anode-side separator 150.

By forming the groove 152 in the anode-side separator 150 in the manner as described above, the water produced in the cathode-side catalyst layer 114 and transmitted to the anode-side catalyst layer 116 through the electrolyte membrane 112 is moved to the downstream side in the hydrogen flow direction, that is, to the surface of the membrane electrode assembly 110 on the upstream side in the air flow direction, by means of both gravity and the hydrogen flow. The upstream side of the electrolyte membrane, which is prone to drying, is thus humidified from the anode side.

According to the fuel cell 100 of the first embodiment as described above, by re-circulating water in a liquid state within the fuel cell 100, it is possible to self-humidify the electrolyte membrane 112 and maintain uniform distribution of moisture in the plane of the electrolyte membrane 112.

B. Second Embodiment

Figure 2A:
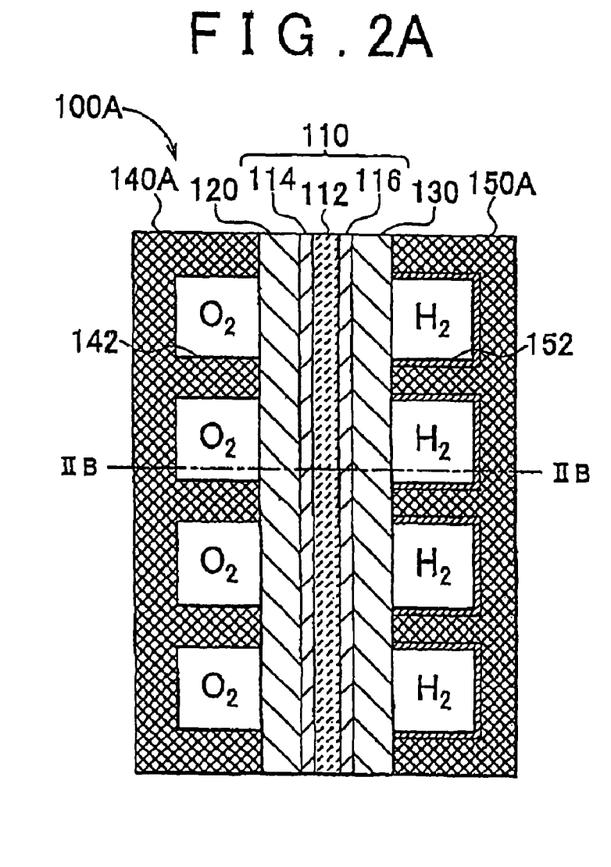
FIGS. 2A and 2B are explanatory views schematically showing the cross sectional structure of a fuel cell 100A according to a second embodiment of the present invention.
Figure 2B:
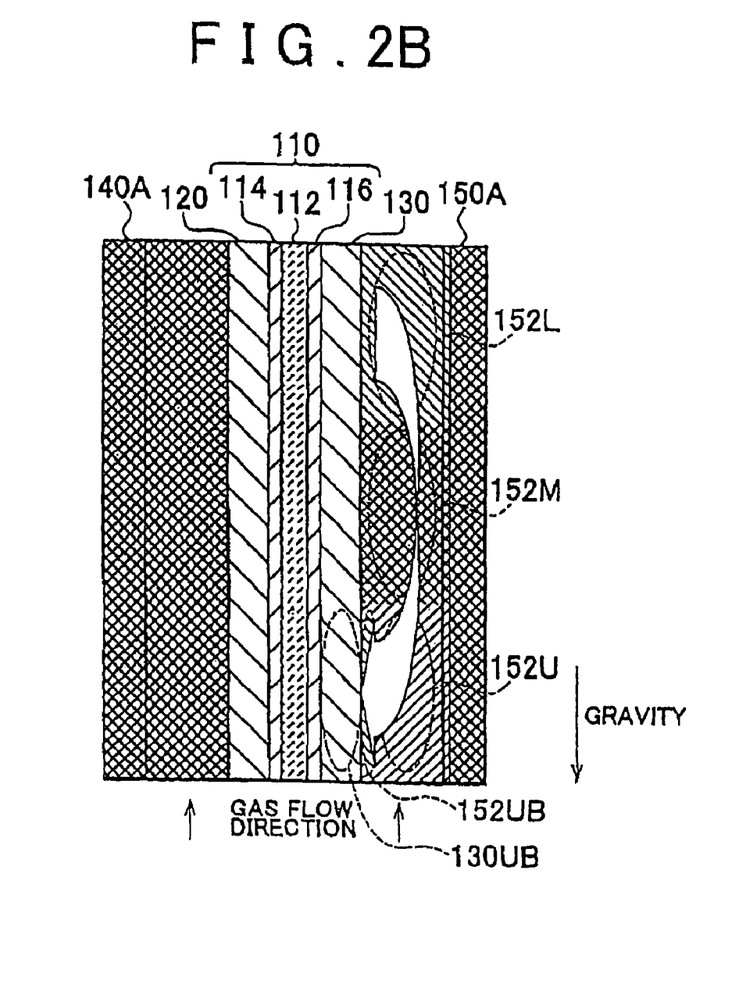

FIGS. 2A and 2B are explanatory views schematically showing the cross sectional structure of a fuel cell 100A according to a second embodiment of the present invention. FIG. 2A is a sectional view as seen in a direction parallel to the direction of gas flow in the fuel cell 100A, and FIG. 2B is a sectional view taken along the line IIB-IIB of FIG. 2A.

As with the fuel cell 100 according to the first embodiment, the fuel cell 100A is formed by bonding the cathode-side gas diffusion layer 120 and the anode-side gas diffusion layer 130 respectively to the surfaces of the membrane electrode assembly 110, and supporting the resulting structure between a cathode-side separator 140A and an anode-side separator 150A.

Because the membrane electrode assembly 110, the cathode-side gas diffusion layer 120, and the anode-side gas diffusion layer 130 are respectively the same as the membrane electrode assembly 110, the cathode-side gas diffusion layer 120, and the anode-side gas diffusion layer 130 in the first embodiment, description thereof will not be repeated.

Now, the configuration for facilitating the self-humidification of the electrolyte membrane 112 in the fuel cell 100A will be described.

As shown in FIG. 2A, the cathode-side separator 140A arranged on the cathode side of the membrane electrode assembly 110 has the groove 142 formed in a surface that is in contact with the cathode-side gas diffusion layer 120. The groove 142 forms a gas flow path in which air flows. The groove 142 can be regarded as a cathode-side gas flow path according to the present invention. The anode-side separator 150A arranged on the anode side of the membrane electrode assembly 110 has the groove 152 formed in a surface that is in contact with the anode-side gas diffusion layer 130. The groove 152 forms a gas flow path in which hydrogen flows. The groove 152 can be regarded as an anode-side gas flow path according to the present invention.

As shown in FIG. 2B, the groove 142 in the cathode-side separator 140A is formed such that air flows in a direction opposite to the direction of gravity, that is, from down to up. It should be noted that unlike the cathode-side separator 140 in the first embodiment, no surface treatments, that is, hydrophilic treatment and hydrophobic treatment, are applied to the surface of the groove 142.

In the fuel cell 100A, drying tends to occur in the upstream side of the electrolyte membrane 112. Accordingly, the amount of power generation and the amount of water produced in the membrane electrode assembly 110 on the downstream side tend to become larger than the amount of power generation and the amount of water produced in the membrane electrode assembly 110 on the upstream side.

In the fuel cell 100A, the groove 142 is formed in the cathode-side separator 140A such that air flows in a direction opposite to the direction of gravity, that is, from down to up. Accordingly, a force directed substantially opposite to the direction of gravity is exerted on the water produced in the cathode-side catalyst layer 114 due to the flow of air, and also gravity is exerted on the water. Therefore, water is pulled down by gravity to be used for humidification of the electrolyte membrane 112, and the speed at which the water moves in the direction of gravity can be decreased by the flow of air. It is thus possible to prevent the water from being discharged from the cathode surface of the membrane electrode assembly 110 without being used for the humidification of the electrolyte membrane 112.

On the other hand, as shown in FIG. 2B, the groove 152 in the anode-side separator 150A is also formed such that hydrogen flows in a direction opposite to the direction of gravity, that is, from down to up. Surface treatment is applied to the surface of the groove 152. Specifically, hydrophilic treatment is applied as surface treatment to a downstream region 152L in the hydrogen flow direction of the groove 152, and hydrophobic treatment is applied to an upstream region 152U in the hydrogen flow direction of the groove 152. In this embodiment, no surface treatment is applied to a midstream region 152M in the hydrogen flow direction of the groove 152. That is, the groove 152 is formed such that the hydrophilicity on the downstream side in the hydrogen flow direction is higher than the hydrophilicity on the upstream side, and that the hydrophobicity on the upstream side is higher than the hydrophobicity on the downstream side. In the upstream region in the hydrogen flow direction of the groove 152, hydrophilic treatment is applied to an upstream side boundary part 152UB with the anode-side gas diffusion layer 130. It should be noted that the hydrophilic treatment and the hydrophobic treatment described above are respectively applied by coating the surface of the groove 152 with a hydrophilic agent and a hydrophobic agent. In the groove 152, the area of the region to which the above-described surface treatment is applied, or the degrees of hydrophilicity and hydrophobicity may be set as appropriate in accordance with the power generation performance of the fuel cell 100A.

By forming the groove 152 in the anode-side separator 150A in the manner as described above, the water produced in the cathode-side catalyst layer 114 and transmitted to the anode-side catalyst layer 116 through the electrolyte membrane 112 moves as described below (see the hollow white arrow in FIG. 2B). It should be noted that as described above, in the fuel cell 100A, drying tends to occur in the upstream side of the electrolyte membrane 112. Accordingly, the amount of power generation and the amount of water produced in the membrane electrode assembly 110 on the downstream side tend to be larger than the amount of power generation and the amount of water produced in the membrane electrode assembly 110 on the upstream side. Therefore, the amount of water transmitted to the anode-side catalyst 116 also tends to be larger on the downstream side than on the upstream side in the air flow direction, that is, the hydrogen flow direction.

In the fuel cell 100A according to this embodiment, the groove 152 in the cathode-side separator 150A is formed such that hydrophilicity is high on the downstream side in the hydrogen flow direction. Accordingly, the water produced in the cathode-side catalyst layer 114 of the membrane electrode assembly 110 on the downstream side in the air flow direction upon power generation and transmitted to the anode-side catalyst layer 116 through the electrolyte membrane 112 is drawn into and retained by the downstream region 152L of the groove 152, which has a high hydrophilicity. Because the groove 152 is formed such that hydrogen flows in the direction opposite to the direction of gravity, the water moves due to gravity from the downstream region 152L to the upstream region 152U through the midstream region 152M, against the flow of hydrogen. Because the groove 152 is formed such that hydrophobicity is high on the upstream side in the hydrogen flow direction, the water that has moved to the upstream region 152U is repelled and drawn into the upstream side boundary part 152UB of high hydrophilicity, and is further moved to the surface of the membrane electrode assembly 110 on the upstream side through the cathode-side gas diffusion layer 130 and the anode-side catalyst layer 116. The upstream side of the electrolyte membrane 112 on, which is prone to drying, can be thus humidified from the anode side.

According to the above-described fuel cell 100A of the second embodiment as well, by re-circulating water in a liquid state within the fuel cell 100A, it is possible to achieve self-humidification of the electrolyte membrane 112 and maintain uniform moisture distribution in the plane of the electrolyte membrane 112.

C. Third Embodiment

Figure 3A:
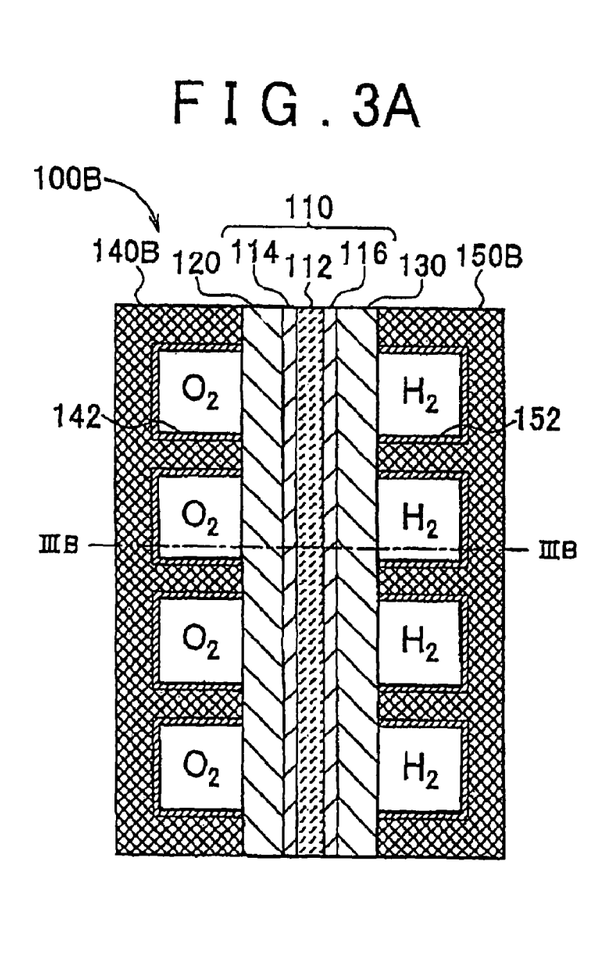
FIGS. 3A and 3B are explanatory views schematically showing the cross sectional structure of a fuel cell 100B according to a third embodiment of the present invention.
Figure 3B:
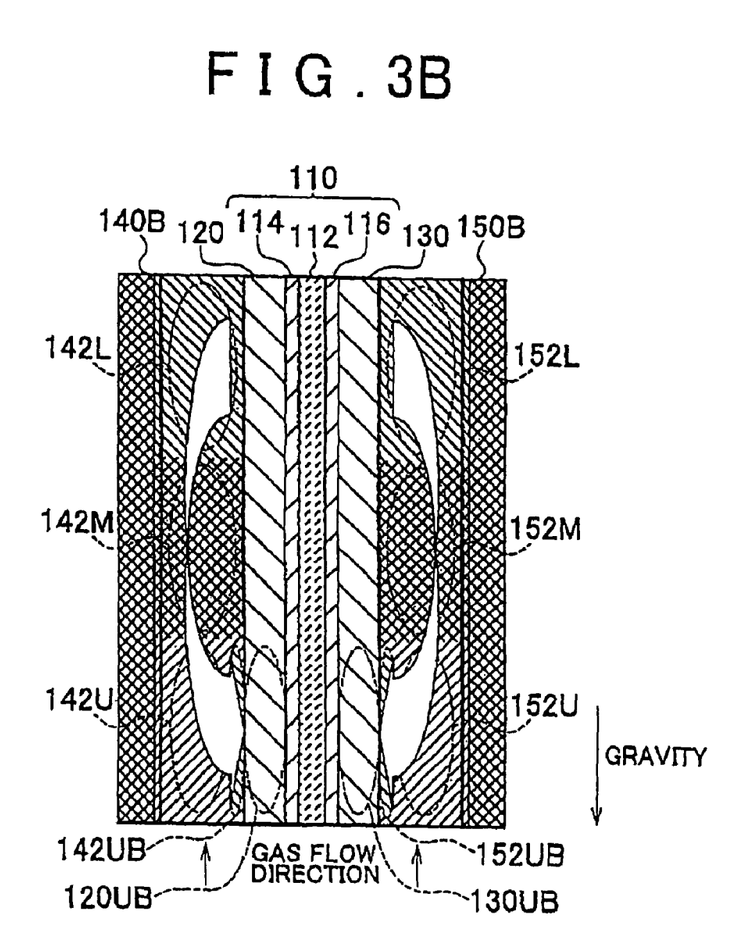

FIGS. 3A and 3B are explanatory views schematically showing the cross sectional structure of a fuel cell 100B according to a third embodiment of the present invention. FIG. 3A is a sectional view as seen in a direction parallel to the direction of gas flow in the fuel cell 100B, and FIG. 3B is a sectional view taken along the line IIB-IIB of FIG. 3A.

As with the fuel cell 100 according to the first embodiment, the fuel cell 100B is formed by bonding the cathode-side gas diffusion layer 120 and the anode-side gas diffusion layer 130 respectively to the surfaces of the membrane electrode assembly 110, and supporting the resulting structure between a cathode-side separator 140B and an anode-side separator 150B.

Because the membrane electrode assembly 110, the cathode-side gas diffusion layer 120, and the anode-side gas diffusion layer 130 are respectively the same as the membrane electrode assembly 110, the cathode-side gas diffusion layer 120, and the anode-side gas diffusion layer 130 in the first embodiment, description thereof will not be repeated.

Now, the configuration for facilitating the self-humidification of the electrolyte membrane 112 in the fuel cell 100B will be described.

As shown in FIG. 3A, the cathode-side separator 140B arranged on the cathode side of the membrane electrode assembly 110 has the groove 142 formed in a surface that is in contact with the cathode-side gas diffusion layer 120. The groove 142 forms a gas flow path in which air flows. The groove 142 can be regarded as a cathode-side gas flow path according to the present invention. The anode-side separator 150B arranged on the anode side of the membrane electrode assembly 110 has the groove 152 formed in a surface that is in contact with the anode-side gas diffusion layer 130. The groove 152 forms a gas flow path in which hydrogen flows. The groove 152 can be regarded as an anode-side gas flow path according to the present invention.

As shown in FIG. 3B, the groove 142 in the cathode-side separator 140B is formed such that air flows in a direction opposite to the direction of gravity, that is, from down to up. The same surface treatment as that applied to the cathode-side separator 140 of the first embodiment is applied to the surface of the groove 142. Specifically, a hydrophilic treatment is applied as surface treatment to the downstream region 142L in the air flow direction of the groove 142, and a hydrophobic treatment is applied to the upstream region 142U in the air flow direction of the groove 142. In this embodiment, no surface treatment is applied to the midstream region 142M in the air flow direction of the groove 142. That is, the groove 142 is formed such that the hydrophilicity on the downstream side in the air flow direction is higher than the hydrophilicity on the upstream side. In the upstream region in the air flow direction of the groove 142, a hydrophilic treatment is applied as surface treatment to the upstream side boundary part 142UB with the cathode-side gas diffusion layer 120.

By forming the groove 142 in the cathode-side separator 140B in the manner as described above, the water produced in the cathode-side catalyst layer 114 moves as described below (see the hollow white arrow in FIG. 3B). It should be noted that generally speaking, in the fuel cell 100B, drying tends to occur in the electrolyte membrane 112 on the upstream side in the air flow direction. Accordingly, the amount of power generation and the amount of water produced in the membrane electrode assembly 110 on the downstream side tend to be larger than the amount of power generation and the amount of water produced in the membrane electrode assembly 110 on the upstream side.

In the fuel cell 100B according to this embodiment, as in the cathode-side separator 140 in the first embodiment, the groove 142 in the cathode-side separator 140B is formed such that hydrophilicity is high on the downstream side in the air flow direction. Accordingly, the water produced in the membrane electrode assembly 110 on the downstream side in the air flow direction upon power generation is drawn into and retained by the downstream region 142L of the groove 142, which has a high hydrophilicity. Because the groove 142 is formed such that air flows in the direction opposite the direction of gravity, the water moves due to gravity from the downstream region 142L to the upstream region 142U through the midstream region 142M, against the flow of air. Because the groove 142 is formed such that hydrophobicity is high on the upstream side in the air flow direction, the water that has moved to the upstream region 142U is repelled and drawn into the upstream side boundary part 142UB of high hydrophilicity, and is further moved to the surface of the membrane electrode assembly 110 on the upstream side through the cathode-side gas diffusion layer 120 and the cathode-side catalyst layer 114, thereby making it possible to humidify the upstream side of the electrolyte membrane 112, which is prone to drying.

On the other hand, as shown in FIG. 3B, the groove 152 in the anode-side separator 150B is also formed such that hydrogen flows in a direction opposite to the direction of gravity, that is, from down to up. The same surface treatment as that applied to the groove 152 of the anode-side separator 150A in the second embodiment is applied to the surface of the groove 152. Specifically, hydrophilic treatment is applied to the downstream region 152L in the hydrogen flow direction of the groove 152, and hydrophobic treatment is applied to the upstream region 152U in the hydrogen flow direction of the groove 152. In this embodiment, no surface treatment is applied to the midstream region 152M in the hydrogen flow direction of the groove 152. That is, the groove 152 is formed such that the hydrophilicity on the downstream side in the hydrogen flow direction is higher than the hydrophilicity on the upstream side. In the upstream region in the hydrogen flow direction of the groove 152, hydrophilic treatment is applied to an upstream side boundary part 152UB with the anode-side gas diffusion layer 130.

By forming the groove 152 in the anode-side separator 150B in the manner as described above, the water produced in the cathode-side catalyst layer 114 and transmitted to the anode-side catalyst layer 116 through the electrolyte membrane 112 moves as described below (see the hollow white arrow in FIG. 3B). It should be noted that as described above, in the fuel cell 100B, drying tends to occur in the upstream side of the electrolyte membrane 112. Accordingly, the amount of power generation and the amount of water produced in the membrane electrode assembly 110 on the downstream side tend to be larger than the amount of power generation and the amount of water produced in the membrane electrode assembly 110 on the upstream side. Therefore, the amount of water transmitted to the anode-side catalyst 116 also tends to be larger on the downstream side than on the upstream side in the air flow direction, that is, the hydrogen flow direction.

In the fuel cell 100B according to this embodiment, as in the anode-side separator 150A in the second embodiment, the groove 152 in the anode-side separator 150B is formed such that hydrophilicity is high on the downstream side in the hydrogen flow direction. Accordingly, the water produced in the cathode-side catalyst layer 114 of the membrane electrode assembly 110 on the downstream side in the air flow direction during power generation and transmitted to the anode-side catalyst layer 116 through the electrolyte membrane 112 is drawn into and retained by the downstream region 152L of the groove 152, which has a high hydrophilicity. Because the groove 152 is formed such that hydrogen flows in the direction opposite to the direction of gravity, the water moves due to gravity from the downstream region 152L to the upstream region 152U through the midstream region 152M, against the flow of hydrogen. Because the groove 152 is formed such that hydrophobicity is high on the upstream side in the hydrogen flow direction, the water that has moved to the upstream region 152U is repelled and drawn into the upstream side boundary part 152UB of high hydrophilicity, and is further moved to the surface of the membrane electrode assembly 110 on the upstream side through the anode-side gas diffusion layer 130 and the anode-side catalyst layer 116. The upstream side of the electrolyte membrane 112, which is prone to drying, is thus humidified from the anode side.

Furthermore, according to the fuel cell 100B of the third embodiment, by re-circulating water in a liquid state within the fuel cell 100B, it is possible to achieve self-humidification of the electrolyte membrane 112 and maintain uniform moisture distribution in the plane of the electrolyte membrane 112.

D. Fourth Embodiment

Figure 4:
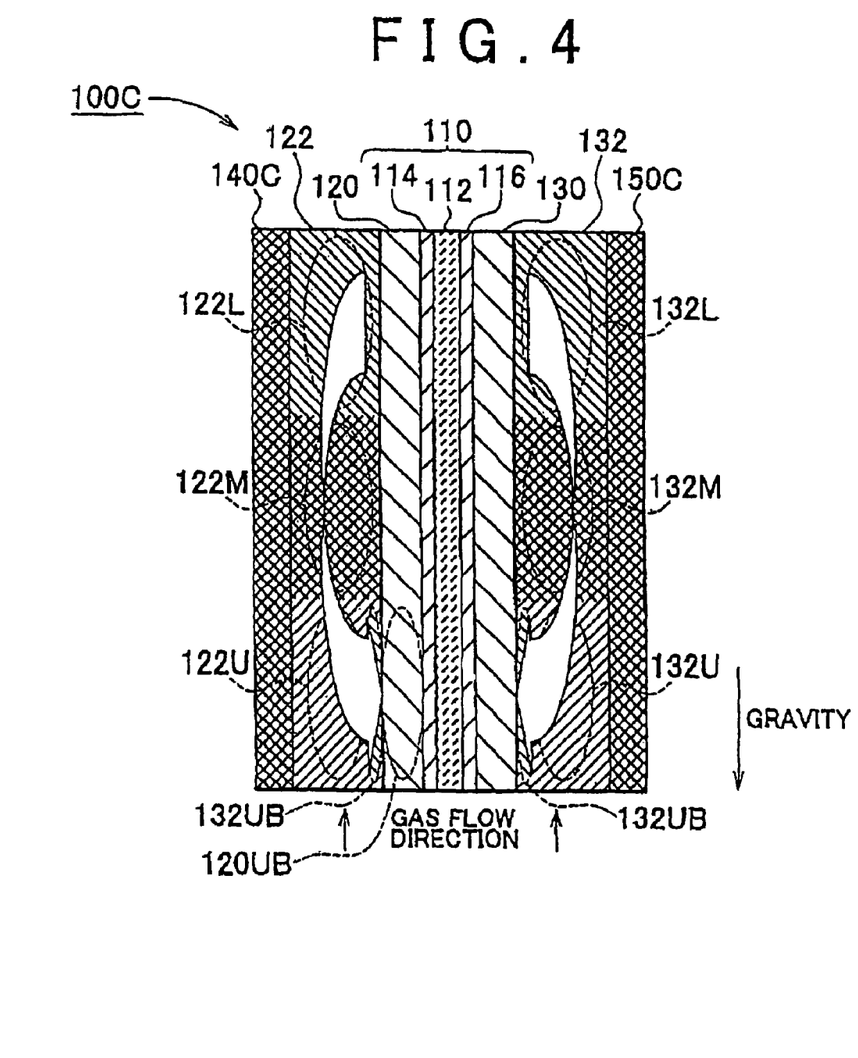
FIG. 4 is an explanatory view schematically showing the cross sectional structure of a fuel cell 100C according to a fourth embodiment of the present invention.

FIG. 4 is an explanatory view schematically showing the cross sectional structure of a fuel cell 100C according to a fourth embodiment of the present invention. FIG. 4 is a sectional view as seen in a direction perpendicular to the direction of gas flow in the fuel cell 100C.

The fuel cell 100C is formed by bonding the cathode-side gas diffusion layer 120 and the anode-side gas diffusion layer 130 respectively to the surfaces of the membrane electrode assembly 110, further arranging a cathode-side metallic porous member 122 and an anode-side metallic porous member 132 respectively on surfaces of the resulting structure, and supporting the resulting structure between a cathode-side separator 140C and an anode-side separator 150C.

The membrane electrode assembly 110, the cathode-side gas diffusion layer 120, and the anode-side gas diffusion layer 130 are the same as those of the above-described embodiments. A gas flow path in which air flows is formed in the cathode-side metallic porous member 122. The gas flow path formed in the cathode-side metallic porous member 122 can be regarded as a cathode-side gas flow path according to the present invention. The anode-side metallic porous member 132 forms a gas flow path in which hydrogen flows. The anode-side metallic porous member 132 can be regarded as an anode-side gas flow path according to the present invention. It should be noted that unlike the separators of the above-described embodiments, the cathode-side separator 140C and the anode-side separator 150C have a flat shape.

As shown in the drawing, the gas flow path formed in the cathode-side metallic porous member 122 is formed such that air flows in a direction opposite to the direction of gravity, that is, from down to up. Surface treatment is applied to the outer surface of the cathode-side metallic porous member 122 and to the inner surfaces of the pores thereof. Specifically, a hydrophilic treatment is applied to a downstream part 122L in the air flow direction of the cathode-side metallic porous member 122, and a hydrophobic treatment is applied to an upstream part 122U in the air flow direction of the cathode-side metallic porous member 122. In this embodiment, no surface treatment is applied to a midstream part 122M in the air flow direction of the cathode-side metallic porous member 122. That is, the cathode-side metallic porous member 122 is formed such that the hydrophilicity on the downstream side in the air flow direction is higher than the hydrophilicity on the upstream side, and that the hydrophobicity on the upstream side is higher than the hydrophobicity on the downstream side. In the upstream region in the air flow direction of the gas flow path formed in the cathode-side metallic porous member 122, hydrophilic treatment is applied to an upstream side boundary 122UB with the cathode-side gas diffusion layer 120. It should be noted that in this embodiment, the hydrophilic treatment and the hydrophobic treatment described above are respectively applied by impregnating the cathode-side metallic porous member 122 with a hydrophilic agent and a hydrophobic agent. In the cathode-side metallic porous member 122, the region to which the above-described surface treatment is applied, or the degrees of hydrophilicity and hydrophobicity may be set as needed in accordance with the power generation performance of the fuel cell 100C or the like.

By forming the cathode-side metallic porous member 122 in the manner as described above, the water produced in the cathode-side catalyst layer 114 moves as described below (see the hollow white arrow in the left side of FIG. 4). It should be noted that in the fuel cell 100C, drying tends to occur in the upstream side of the electrolyte membrane 112. Accordingly, the amount of power generation and the amount of water produced in the membrane electrode assembly 110 on the downstream side tend to be larger than the amount of power generation and the amount of water produced in the membrane electrode assembly 110 on the upstream side.

In the fuel cell 100C according to this embodiment, the cathode-side metallic porous member 122 is formed such that hydrophilicity is high on the downstream side in the airflow direction. Accordingly, the water produced in the membrane electrode assembly 110 on the downstream side in the air flow direction upon power generation is drawn into and retained by the downstream part 122L of the cathode-side metallic porous member 122 which has a high hydrophilicity. Because the gas flow path formed in the cathode-side metallic porous member 122 is formed such that air flows in the direction opposite the direction of gravity, the water is pulled down by gravity from the downstream part 122L to the upstream part 122U through the midstream part 122M, against the flow of air. Because the cathode-side metallic porous member 122 is formed such that hydrophobicity is high on the upstream side in the air flow direction, the water that has moved to the upstream part 122U is repelled and drawn into the upstream side boundary part 122UB of high hydrophilicity, and is further moved to the surface of the membrane electrode assembly 110 on the upstream side through the cathode-side gas diffusion layer 120 and the cathode-side catalyst layer 114, thereby making it possible to humidify the upstream side of the electrolyte membrane 112, which is prone to drying.

On the other hand, the anode-side metallic porous member 132 is also formed such that hydrogen flows in a direction opposite to the direction of gravity, that is, from down to up. Surface treatment similar to the cathode-side metallic porous member 122 is applied to the outer surface of the anode-side metallic porous member 132 and to the inner surfaces of the pores thereof. Specifically, hydrophilic treatment is applied to a downstream part 132L in the hydrogen flow direction of the anode-side metallic porous member 132, and hydrophobic treatment is applied to an upstream part 132U in the hydrogen flow direction of the anode-side metallic porous member 132. In this embodiment, no surface treatment is applied to a midstream part 132M in the hydrogen flow direction of the anode-side metallic porous member 132. That is, the anode-side metallic porous member 132 is formed such that the hydrophilicity on the downstream side in the hydrogen flow direction is higher than the hydrophilicity on the upstream side. In the upstream region in the hydrogen flow direction of the anode-side metallic porous member 132, a hydrophilic treatment is applied to an upstream side boundary part 132UB with the anode-side gas diffusion layer 130. It should be noted that in this embodiment, the hydrophilic treatment and the hydrophobic treatment described above are respectively applied by impregnating the anode-side metallic porous member 132 with a hydrophilic agent and a hydrophobic agent. In the anode-side metallic porous member 132, the region to which the above-described surface treatment is applied, or the degrees of hydrophilicity and hydrophobicity may be set as appropriate in accordance with the power generation performance of the fuel cell 100C.

By forming the anode-side metallic porous member 132 in the manner as described above, the water produced in the cathode-side catalyst layer 114 and transmitted to the anode-side catalyst layer 116 through the electrolyte membrane 112 moves as described below (see the hollow white arrow in the right side of FIG. 4). It should be noted that as described above, in the fuel cell 100C, drying tends to occur in the upstream side of the electrolyte membrane 112. Accordingly, the amount of power generation and the amount of water produced in the membrane electrode assembly 110 on the downstream side tend to be larger than the amount of power generation and the amount of water produced in the membrane electrode assembly 110 on the upstream side. Therefore, the amount of water transmitted to the anode-side catalyst 116 also tends to be larger on the downstream side than on the upstream side in the air flow direction, that is, the hydrogen flow direction.

In the fuel cell 100C according to this embodiment, the anode-side porous metallic member 132 is formed such that hydrophilicity is high on the downstream side in the hydrogen flow direction. Accordingly, the water produced in the cathode-side catalyst layer 114 of the membrane electrode assembly 110 on the downstream side in the air flow direction during power generation and transmitted to the anode-side catalyst layer 116 through the electrolyte membrane 112 is drawn into and retained by the downstream part 132L of the anode-side metallic porous member 132, which has a high hydrophilicity. Because the anode-side porous metallic member 132 is formed such that hydrogen flows in the direction opposite to the direction of gravity, the water moves due to gravity from the downstream part 132L to the upstream part 132U through the midstream part 132M, against the flow of hydrogen. Because the anode-side porous metallic member 132 is formed such that hydrophobicity is high on the upstream side in the hydrogen flow direction, the water that has moved to the upstream part 132U is repelled and drawn into the upstream side boundary part 132UB of high hydrophilicity, and is further moved to the surface of the upstream side of the membrane electrode assembly 110 through the anode-side gas diffusion layer 130 and the anode-side catalyst layer 116. The upstream side of the electrolyte membrane 112, which is prone to drying, is thus humidified from the anode side.

According to the fuel cell 100C of the fourth embodiment, as well as in the fuel cell 100B according to the third embodiment, by re-circulating water in a liquid state within the fuel cell 100C, it is possible to achieve self-humidification of the electrolyte membrane 112 and maintain uniform moisture distribution in the plane of the electrolyte membrane 112.

E. Modifications

While the present invention has been described above by way of embodiments, the present invention is by no means limited to the above-described embodiments and can be implemented in a variety of ways without departing from the scope thereof. Examples of possible modifications are given below.

E1. Modification 1

In the first embodiment, the groove 152 in the anode-side separator 150 is formed such that hydrogen flows in the same direction as the direction of gravity, the present invention is not limited to this, and the configuration of the groove 152 may be changed as appropriate. It should be noted, however, that when the groove 152 in the anode-side separator 150 is formed such that hydrogen flows in the same direction as the direction of gravity as in the first embodiment, the water produced in the cathode-side catalyst layer 114 and transmitted to the anode-side catalyst layer 116 through the electrolyte membrane 112 can be moved to the downstream side in the hydrogen flow direction, that is, to the surface of the upstream side of the membrane electrode assembly 110, by means of both the gravity and hydrogen flow. The upstream side of the electrolyte membrane 112, which is prone to drying, is thus humidified from the anode side.

E2. Modification 2

In the second embodiment, the groove 142 in the cathode-side separator 140A is formed such that air flows in the direction opposite to the direction of gravity, the present invention is not limited to this, and the configuration of the groove 142 may be changed as appropriate. It should be noted, however, that when the groove 142 in the cathode-side separator 140A is formed such that air flows in the direction opposite the direction of gravity, as in the second embodiment, water pulled down by gravity may be used to humidify the electrolyte membrane 112, and the speed at which the water moves in the direction of gravity may be decreased by the flow of air, thereby making it possible to prevent the water from being discharged from the cathode surface of the membrane electrode assembly 110 without being used for the humidification of the electrolyte membrane 112.

E3. Modification 3

In the first and third embodiments, in the upstream region in the air flow direction of the groove 142 in the cathode-side separator 140, 140B, a hydrophilic treatment is applied to the upstream side boundary part 142UB with the cathode-side gas diffusion layer 120. However, such hydrophilic treatment is not required. It should be noted, however, that by applying hydrophilic treatment to the upstream side boundary part 142UB, water can be readily moved from the upstream region 142U to the cathode-side gas diffusion layer 120. Hydrophilic treatment may be applied to the cathode-side gas diffusion layer 120. Hydrophilic treatment may be applied to an upside part 120UB of the cathode-side gas diffusion layer 120 which faces the upstream side boundary part 142UB of the cathode-side separator 140, 140B. Hydrophilic treatment may be applied to both the upside part 120UB and the upstream side boundary part 142UB. When hydrophilic treatment is applied to both the upside part 120UB and the upstream side boundary part 142UB, hydrophilicity of the upside part 120UB may be made higher than hydrophilicity of the upstream side boundary part 142UB. The upside part 120UB may be regarded as the upstream side portion of a boundary part of the cathode.

In the second and third embodiments, in the upstream region in the hydrogen flow direction of the groove 152 in the anode-side separator 150, 150B, hydrophilic treatment is applied to the upstream side boundary part 152UB with the anode-side gas diffusion layer 130. However, such hydrophilic treatment is not required. It should be noted, however, that by applying hydrophilic treatment to the upstream side boundary part 152UB, water may be readily moved from the upstream region 152U to the anode-side gas diffusion layer 130. Hydrophilic treatment may be applied to an upside part 130UB of the anode-side gas diffusion layer 130 which faces the upstream side boundary part 152UB of the anode-side separator 150A, 150B. Hydrophilic treatment may be applied to both the upside part 130UB and the upstream side boundary part 152UB. When hydrophilic treatment is applied to both the upside part 130UB and the upstream side boundary part 152UB, hydrophilicity of the upside part 130UB may be made higher than hydrophilicity of the upstream side boundary part 152UB. The upside part 130UB may be regarded as the upstream side portion of a boundary part of the anode.

In the fourth embodiment, in the upstream region in the air flow direction of the cathode-side metallic porous member 122, hydrophilic treatment is applied to the upstream side boundary part 122UB with the cathode-side gas diffusion layer 120. However, such hydrophilic treatment is not required. It should be noted, however, that by applying hydrophilic treatment to the upstream side boundary part 122UB, water can be readily moved from the upstream part 122U to the cathode-side gas diffusion layer 120. Further, in the upstream region in the hydrogen flow direction of the anode-side metallic porous member 132, hydrophilic treatment is similarly applied to the upstream side boundary part 132UB with the anode-side gas diffusion layer 130. However, such hydrophilic treatment is not required. It should be noted, however, that by applying a hydrophilic treatment to the upstream side boundary part 132UB, water can be readily moved from the upstream part 132U to the anode-side gas diffusion layer 130.

E4. Modification 4

In the first and third embodiments, a hydrophilic treatment is applied to the downstream region 142L in the air flow direction of the groove 142 in the cathode-side separator 140, 140B, and a hydrophobic treatment is applied to the upstream region 142U in the air flow direction of the groove 142. However, the present invention is not limited to this. As long as the groove 142 is formed such that the hydrophilicity on the downstream side in the air gas flow direction is higher than the hydrophilicity on the upstream side, the degrees of hydrophobicity and hydrophilicity may be set to change continuously or stepwise from the upstream side toward the downstream side in the air flow direction. The same applies to the cathode-side metallic porous member 122 of the fourth embodiment.

In the second and third embodiments, a hydrophilic treatment is applied to the downstream region 152L in the hydrogen flow direction of the groove 152 in the anode-side separator 150A, 150B, and a hydrophobic treatment is applied to the upstream region 152U in the hydrogen flow direction of the groove 152. However, the present invention is not limited to this. As long as the groove 152 is formed such that the hydrophilicity on the downstream side in the hydrogen flow direction is higher than the hydrophilicity on the upstream side, the degrees of hydrophobicity and hydrophilicity may be set to change continuously or stepwise from the upstream side toward the downstream side in the hydrogen flow direction. The same applies to the anode-side metallic porous member 132 of the fourth embodiment.

E5. Modification 5

In the first embodiment, the groove 142 in the cathode-side separator 140 is formed such that air flows in the direction opposite to the direction of gravity. In the second embodiment, the groove 152 in the anode-side separator 150A is formed such that hydrogen flows in the direction opposite to the direction of gravity. Further, in the third embodiment, the groove 142 in the cathode-side separator 140B and the groove 152 in the anode-side separator 150B are formed such that both air and hydrogen flow in the direction opposite the direction of gravity, and the hydrophilic treatment and the hydrophobic treatment described above are applied to each of these grooves. However, the present invention is not limited to this. In cases where a fuel cell is used in an environment where an external force other than gravity, such as a centrifugal force, is constantly exerted on the water, the grooves may instead be formed such that gas flows in a direction opposite the direction of the external force exerted on the water. The same applies to the cathode-side metallic porous member 122 and the anode-side metallic porous member 132 in the third embodiment described above.

The invention claimed is:

1. A fuel cell comprising:
a membrane electrode assembly having an anode and a cathode respectively bonded to surfaces of a polymer electrolyte membrane;
a first separator and a second separator that support the membrane electrode assembly therebetween, wherein the first separator is provided on a anode side and the second separator is provided on a cathode side;
an anode-side gas flow path, provided between the anode and the first separator, that supplies fuel gas containing hydrogen to the anode; and
a cathode-side gas flow path, provided between the cathode and the second separator, that supplies oxidant gas containing oxygen to the cathode,
wherein the cathode-side gas flow path is formed so that the oxidant gas flows in a direction substantially opposite to a direction of an external force that is exerted on water produced at the cathode by an electrochemical reaction between hydrogen contained in the fuel gas and oxygen contained in the oxidant gas during power generation, and that hydrophilicity on a downstream side of the cathode-side gas flow path in a flow direction of the oxidant gas is higher than hydrophilicity on an upstream side.

2. The fuel cell according to claim 1, wherein:
the cathode-side gas flow path is formed so that, on the upstream side in the flow direction of the oxidant gas, hydrophilicity at a portion where an upstream-side portion of the separator overlaps with a boundary part of the separator with the cathode is higher than hydrophilicity at the other part of the upstream-side portion of the separator.

3. The fuel cell according to claim 1, wherein:
hydrophilicity at a portion where an upstream-side portion of the cathode overlaps with a boundary part of the cathode with the separator is higher than hydrophilicity at the upstream-side portion of the separator.

4. The fuel cell according to claim 1, wherein:
hydrophilicity at the portion where the upstream-side portion of the cathode overlaps with the boundary part of the cathode is higher than hydrophilicity at another portion of the cathode.

5. The fuel cell according to claim 1, wherein:
the cathode-side gas flow path is a groove formed in a surface of the separator that is in contact with the cathode.

6. The fuel cell according to claim 1, wherein:
the cathode-side gas flow path is formed in a metallic porous member.

7. The fuel cell according to claim 1, wherein:
a hydrophilic treatment is applied to the downstream side of the cathode-side gas flow path, and a hydrophobic treatment is applied to the upstream side.

8. The fuel cell according to claim 1, wherein:
a higher hydrophilicity is set on the downstream side of the cathode-side gas flow path than in a midstream region, and a higher hydrophobicity is set higher on the upstream side of the cathode-side gas flow path than in the midstream region.

9. The fuel cell according to claim 1, wherein:
the anode-side gas flow path is formed so that the fuel gas flows in substantially the same direction as the direction of the external force.

10. The fuel cell according to claim 1, wherein the anode-side gas flow path is formed so that:
the fuel gas flows in substantially the same direction as the direction of the external force; and
a hydrophilicity on the downstream side of the anode-side gas flow path, in the flow direction of the fuel gas, is higher than hydrophilicity on the upstream side.

11. The fuel cell according to claim 10, wherein:
the anode-side gas flow path is formed so that, on the upstream side in the flow direction of the fuel gas, hydrophilicity at a portion where an upstream-side portion of the separator overlaps with a boundary part of the separator with the anode is higher than hydrophilicity at the other part of the upstream-side portion of the separator.

12. The fuel cell according to claim 10, wherein:
the anode-side gas flow path is a groove formed in a surface of the separator that is in contact with the anode.

13. The fuel cell according to claim 10, wherein:
the anode-side gas flow path is formed in a metallic porous member.

14. The fuel cell according to claim 1, wherein:
the direction of the external force is the direction of gravity.

15. A fuel cell system, comprising:
the fuel cell according to claim 1,
a fuel gas supplying source that supplies the fuel gas to the anode-side gas flow path,
a first gas passage between the fuel gas supplying source and the anode-side gas flow path,
an oxidant gas supplying source that supplies the oxidant gas to the cathode-side gas flow path so that the oxidant gas flows in a direction substantially opposite to a direction of an external force in the cathode-side gas flow path
a second gas passage between the oxidant gas supplying source and the cathode-side gas flow path.

16. The fuel cell according to claim 1, wherein:
the first separator and the second separator are provided in a vertical direction.

17. The fuel cell according to claim 1, wherein:
the anode-side gas flow path is straight.

18. The fuel cell according to claim 1, wherein:
the cathode-side gas flow path is straight.

19. The fuel cell according to claim 1, wherein:
the external force is a gravitational force.

20. A fuel cell comprising:
a membrane electrode assembly having an anode and a cathode respectively bonded to surfaces of an electrolyte membrane made of a polymer electrolyte membrane;
a first separator and a second separator for supporting the membrane electrode assembly therebetween, the first separator being provided on a anode side, the second separator being provided on a cathode side;
an anode-side gas flow path provided between the anode and the first separator, for supplying fuel gas containing hydrogen to the anode; and
a cathode-side gas flow path provided between the cathode and the second separator, that supplies oxidant gas containing oxygen to the cathode,
wherein the anode-side gas flow path is formed so that the fuel gas flows in a direction substantially opposite to a direction of an external force that is exerted on water produced at the cathode by an electrochemical reaction between hydrogen contained in the fuel gas and oxygen contained in the oxidant gas upon power generation, and that hydrophilicity on a downstream side of the anode-side gas flow path in a flow direction of the fuel gas is higher than hydrophilicity on an upstream side.

21. The fuel cell according to claim 20, wherein:
the anode-side gas flow path is formed so that, on the upstream side in the flow direction of the fuel gas, hydrophilicity at a portion where an upstream-side portion of the separator overlaps with a boundary part of the separator with the anode is higher than hydrophilicity at the other part of the upstream-side portion of the separator.

22. The fuel cell according to claim 20, wherein:
hydrophilicity at a portion where an upstream-side portion of the anode overlaps with a boundary part of the anode with the separator is higher than hydrophilicity at the upstream side portion of the separator.

23. The fuel cell according to claim 20, wherein:
hydrophilicity at the portion where the upstream-side portion of the anode overlaps with the boundary part of the anode is higher than hydrophilicity at another portion of the anode.

24. The fuel cell according to claim 20, wherein:
the anode-side gas flow path is a groove formed in a surface of the separator that is in contact with the anode.

25. The fuel cell according to claim 20, wherein:
the anode-side gas flow path is formed in a metallic porous member.

26. The fuel cell according to claim 20, wherein:
the cathode-side gas flow path is formed so that the fuel gas flows in a direction substantially opposite to the direction of the external force.

27. The fuel cell according to claim 20, wherein:
a hydrophilic treatment is applied to the downstream side of the anode-side gas flow path, and hydrophobic treatment is applied to the upstream side.

28. The fuel cell according to claim 20, wherein:
a higher hydrophilicity is set on the downstream side of the cathode-side gas flow path than in a midstream region, and a higher hydrophobicity is set higher on the upstream side of the anode-side gas flow path than in the midstream region.

29. A fuel cell system, comprising:
the fuel cell according to claim 20,
an oxidant supplying source that supplies the oxidant gas to the cathode-side gas flow path,
a first gas passage between the oxidant gas supplying source and the cathode-side gas flow path,
a fuel gas supplying source that supplies the fuel gas to the anode-side gas flow path so that the fuel gas flows in a direction substantially opposite to a direction of an external force in the anode-side gas flow path
a second gas passage between the fuel gas supplying source and the anode-side gas flow path.

30. The fuel cell according to claim 20, wherein:
the direction of the external force is the direction of gravity.

31. The fuel cell according to claim 20, wherein:
the first separator and the second separator are provided in a vertical direction.

32. The fuel cell according to claim 20, wherein:
the anode-side gas flow path is straight.

33. The fuel cell according to claim 20, wherein:
the cathode-side gas flow path is straight.

* * * * *